United States Patent
Hasberg

(10) Patent No.: US 12,540,831 B2
(45) Date of Patent: Feb. 3, 2026

(54) METHOD AND DEVICE FOR UPDATING A MAP

(71) Applicant: Robert Bosch GmbH, Stuttgart (DE)

(72) Inventor: Carsten Hasberg, Ilsfeld-Auenstein (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 18/314,252

(22) Filed: May 9, 2023

(65) Prior Publication Data

US 2023/0392951 A1    Dec. 7, 2023

(30) Foreign Application Priority Data

Jun. 3, 2022 (DE) .................. 10 2022 205 686.8

(51) Int. Cl.
*G01C 21/00* (2006.01)
*G01C 21/32* (2006.01)

(52) U.S. Cl.
CPC ......... *G01C 21/3841* (2020.08); *G01C 21/32* (2013.01)

(58) Field of Classification Search
CPC ............... G01C 21/3841; G01C 21/32; G01C 21/3859; G01C 21/3848
USPC ......... 701/450, 532, 409, 533, 461, 410, 25, 701/400, 451, 408, 23, 411, 446, 468, 701/431, 455, 454, 420
See application file for complete search history.

(56) References Cited

U.S. PATENT DOCUMENTS

| | | | |
|---|---|---|---|
| 11,788,863 B2 * | 10/2023 | Chikamori | G01C 21/3859 701/24 |
| 2018/0149487 A1 * | 5/2018 | Lee | G01C 21/3841 |
| 2018/0349715 A1 * | 12/2018 | Gupta | G08G 1/20 |
| 2020/0141740 A1 * | 5/2020 | Hamer | G01C 21/3811 |
| 2020/0348145 A1 * | 11/2020 | Paranjpe | G01C 21/3676 |

(Continued)

FOREIGN PATENT DOCUMENTS

| | | |
|---|---|---|
| DE | 102018005954 A1 | 1/2019 |
| DE | 102017215708 A1 | 3/2019 |

(Continued)

OTHER PUBLICATIONS

Surface Vehicle Recommended Practice, "Taxonomy and Definitions for Terms Related to Driving Automation System for On-Road Motor Vehicles," SAE International, SAE Standard J3016, 2018, pp. 1-35.

*Primary Examiner* — Anne Marie Antonucci
*Assistant Examiner* — Jodi Jones
(74) *Attorney, Agent, or Firm* — Norton Rose Fulbright US LLP

(57) ABSTRACT

A method and device for updating a map. The method includes a step of receiving environment data values, the environment data values representing an environment in a predefined region, and the environment data values being acquired and transmitted by a plurality of vehicles driving through this region; a step of carrying out a comparison of the environment data values to map data values, the map data values representing the map, the map representing an image of the predefined region, and the comparison including a deviation of the image from the environment; and a step of updating the map with the aid of the environment data values, or of providing a driving strategy for at least one mapping vehicle, the driving strategy including traveling the predefined region.

5 Claims, 1 Drawing Sheet

(56) References Cited

U.S. PATENT DOCUMENTS

| | | |
|---|---|---|
| 2021/0004363 A1 | 1/2021 | Bailly et al. |
| 2021/0074156 A1* | 3/2021 | Brookins et al. |
| 2021/0341308 A1* | 11/2021 | Ivanov ............... G01C 21/3837 |
| 2021/0396528 A1* | 12/2021 | St. Romain ............. G06F 16/23 |
| 2022/0011120 A1 | 1/2022 | St. Romain et al. |
| 2023/0017969 A1* | 1/2023 | Mortier .............. G01C 21/3881 |
| 2023/0168688 A1* | 6/2023 | Song .................... G05D 1/0274 |
| | | 701/25 |

FOREIGN PATENT DOCUMENTS

| | | |
|---|---|---|
| DE | 102018008988 A1 | 5/2019 |
| DE | 102018118215 A1 | 1/2020 |
| DE | 102019216747 A1 | 5/2021 |
| DE | 112018008077 T5 | 9/2021 |

\* cited by examiner

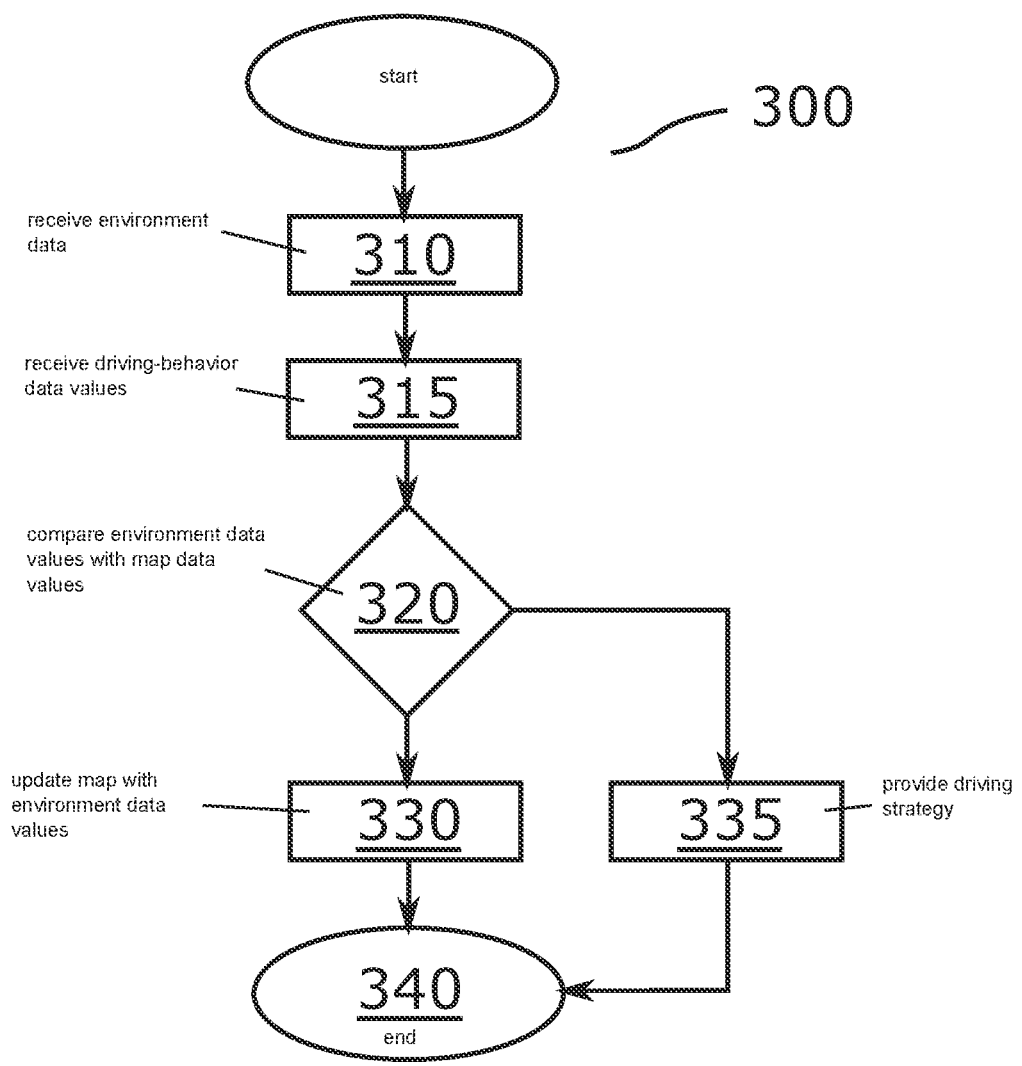

METHOD AND DEVICE FOR UPDATING A MAP

CROSS REFERENCE

The present application claims the benefit under 35 U.S.C. § 119 of German Patent Application No. DE 10 2022 205 686.8 filed on Jun. 3, 2022, which is expressly incorporated herein by reference in its entirety.

FIELD

The present invention, among others, relates to a method for updating a map, the method having a step of receiving environment data values; a step of carrying out a comparison of the environment data values to map data values, the map data values representing the map; and a step of updating the map with the aid of the environment data values or of providing a driving strategy for at least one mapping vehicle, the driving strategy including traveling the predefined region.

SUMMARY

The method for updating a map according to an example embodiment of the present invention includes a step of receiving environment data values, the environment data values representing an environment in a predefined region, and the environment data values being acquired and transmitted by a plurality of vehicles driving through this region. In addition, the method includes a step of carrying out a comparison of the environment data values to map data values, the map data values representing the map, the map representing an image of the predefined region, and the comparison including a deviation of the image from the environment; and a step of updating the map with the aid of the environment data values or of providing a driving strategy for at least one mapping vehicle, the driving strategy including traveling the predefined region.

A map is to be understood as a digital map which is provided in the form of (map) data values on a memory medium. For example, the map is developed in such a way that one or more map layer(s) is/are encompassed, and a map layer, for instance, shows a map from a bird's eye perspective (the extension and position of roads, buildings, scenery features, etc.). This corresponds to a map of a navigation system, for instance. A further map layer, for example, includes a radar map in which environment features encompassed by the radar map are stored together with a radar signature. A further map layer includes a lidar map, for example, and environment features encompassed by the lidar map are stored with a lidar signature.

In one example embodiment of the present invention, the map is developed as a highly precise map. In particular, the highly precise map is developed in such a way that it is suitable for the navigation of an automated vehicle. For example, this may mean that the highly precise map is designed to determine a highly precise position of the automated vehicle by comparing stored environment features with acquired sensor data values of this automated vehicle. For this purpose, the highly precise map includes these environment features with highly precise position information (coordinates), for example. An automated vehicle describes a partially, highly, or fully automated vehicle according to one of the SAE levels 1 to 5 (see the SAE J3016 standard).

A highly precise position is to be understood as a position which is so precise within a predefined coordinate system, for instance WGS84 coordinates, that this position does not exceed a maximally permissible unsharpness. The maximum unsharpness may depend on the environment, for example. In addition, for instance, the maximum unsharpness may depend on whether the vehicle is operated in a manual or in a partially, highly, or fully automated manner (according to one of the SAE levels 1 to 5). As a matter of principle, the maximum unsharpness is so low that a safe operation of the automated vehicle is ensured, in particular. For a fully automated operation of the automated vehicle, the maximum unsharpness is of an order of magnitude of approximately 10 centimeters, for example.

A predefined region, for instance, is to be understood as a certain road section (for example between two intersections and/or between two on- or off-ramps) and/or multiple interconnected traffic routes, etc.

According to an example embodiment of the present invention, the acquisition of the environment data values, for example, is accomplished in that the vehicles are equipped with a environment sensor system suitable for this purpose. An environment sensor system is to be understood as at least one video sensor and/or at least one radar sensor and/or at least one lidar sensor and/or at least one ultrasonic sensor and/or at least one further sensor, which is/are designed to acquire an environment of a vehicle in the form of environment data values. In one possible embodiment, the environment sensor system is equipped with a computing unit for this purpose (processor, working memory, hard disk) including a suitable software, and/or is connected to such a computing unit.

For example, carrying out a comparison of the environment data values with map data values means that environment features in the environment data values are determined and these environment features are compared with environment features included by the map. In this context, environment features, for example, are infrastructure features (roadway demarcation lines, guardrails, etc.) and/or traffic signs (road signs, traffic lights, etc.), and/or construction features (buildings, bridges, tunnels, etc.) and/or further features that are able to be detected with the aid of an environment sensor system. A comparison is carried out in such a way, for instance, that positions of the environment features, starting from the environment data values, relative to the vehicles are determined and compared to the positions stored in the map. In a further embodiment, a comparison is alternatively or additionally carried out in such a way that a number of environment features stored in the map is compared to the number of actually detected environment features.

A mapping vehicle, for example, is to be understood as a manually operated vehicle (SAE level 0) or an automated vehicle. For instance, providing a driving strategy means that—depending on an embodiment of the at least one mapping vehicle (manual or automated)—a route to be traveled in the predefined region is transmitted to the at least one mapping vehicle. If the at least one mapping vehicle is embodied as an automated vehicle, the driving strategy, for instance, includes information pertaining to the execution of a lateral and/or longitudinal control, the lateral and/or longitudinal control being carried out in such a way that the corresponding automated vehicle moves along a trajectory included by the driving strategy.

In an advantageous manner, the method according to an example embodiment of the present invention provides a method for updating a map in a predefined region. This object is achieved with the aid of the method according to the present invention in that environment data values that are acquired by a plurality of vehicles are compared to map data values, the map data values representing the map. This makes it possible to detect changes in the environment in this region in a timely manner without requiring a selective search for these changes in this region. Since the majority of vehicles includes sensors as it is, it is possible to use them in a cost-effective manner. For example, if changes that exceed a predefined maximum deviation are detected, a mapping vehicle is able to be used to map this region in a selective manner. The present method thus discloses a comprehensive economical and effective method for providing an updated map or for appropriately updating an already existing map.

The updating of the map preferably takes place with the aid of the environment data values if the comparison does not exceed a predefined maximum deviation.

For example, an updating of the map means that new environment features are newly integrated into the map in accordance with their position, and/or that environment features already included by the map are removed from the map data, and/or characteristics (size, color, position, shape, etc.) included by the map data of environment features already included by the map are modified or adapted.

According to an example embodiment of the present invention, driving-behavior data values are preferably received in addition, the driving-behavior data values representing a driving behavior of the vehicles that acquire and transmit the environment data values. The comparison is additionally carried out as a function of the driving-behavior data values.

For example, a driving behavior of the vehicles describes that these vehicles use a certain traffic lane in the region at least at one point and/or do not exceed a certain driving speed at at least one point and/or leave a traffic lane at at least one point, etc. This suggests the fact that a change, etc. that does not correspond to the current map has occurred at least at one of these points so that the environment data values at these points may be analyzed in a selective manner, for instance.

The device according to an example embodiment of the present invention, in particular a computing unit, is designed to execute all steps of the method for updating a map according to one of the method steps. For example, a computing unit is to be understood as a server or a server interconnection such as a cloud.

The device or the computing unit includes a processor, a working memory, a storage memory, and a suitable software to carry out the method according to the present invention. In addition, the device includes an interface for outputting and receiving data values with the aid of a wire-bound and/or wireless connection, e.g., to or from corresponding devices of vehicles (control units, communication devices, environment sensor systems, navigation system, etc.) and/or further vehicle-external devices (server, cloud, etc.).

According to an example embodiment of the present invention, a computer program is provided in addition, which includes instructions that when the computer program is executed by a computer, induce this computer to execute a method for updating a map according to an example embodiment of the present invention. In one embodiment, the computer program corresponds to the software included by the device.

In addition, a machine-readable memory medium is provided on which the computer program is stored.

Advantageous refinements of the present invention are disclosed herein.

BRIEF DESCRIPTION OF THE DRAWING

Exemplary embodiments of the present invention are shown in the FIGURE and described in greater detail in the following description.

FIG. 1 shows, in the form of a flow diagram, an exemplary embodiment of the method for updating a map according to the present invention.

DETAILED DESCRIPTION OF EXAMPLE EMBODIMENTS

FIG. 1 shows a possible exemplary embodiment of a method 300 for updating 330 a map.

In step 310, environment data values are received, the environment data values representing an environment in a predefined region, the environment data values being acquired and transmitted by a plurality of vehicles traveling through this region.

In one alternative embodiment, method 300 also includes a step 315. In step 315, driving-behavior data values are received in addition, the driving-behavior data values representing a driving behavior of the vehicles that acquire and transmit the environment data values. Steps 310 and 315 are able to be carried out both in parallel and one after the other in any desired sequence.

In step 320, a comparison of the environment data values with map data values is carried out, the map data values representing the map, the map representing an image of the predefined region, and the comparison including a deviation of the image from the environment. Step 330 or step 335 follows next, depending on the comparison. In the alternative embodiment of method 300 including step 315, comparison 320 is additionally carried out as a function of the driving-behavior data values.

In step 330, the map is updated with the aid of the environment data values.

In step 335, a driving strategy for at least one mapping vehicle is provided, the driving strategy including traveling the predefined region.

In step 340, method 300 ends.

What is claimed is:

1. A method for using an electronic map, the method comprising the following steps:
receiving, by a computer, from a plurality of vehicles driving through a predefined region, and via a wireless network, environment data values that represent sensor signals generated by sensors of the plurality of vehicles sensing an environment in the predefined region
comparing, by the computer, spatial data of features represented by the environment data values to spatial data of corresponding features represented in the electronic map, thereby determining a deviation representing a spatial displacement between the features represented by the environment data values and the corresponding features represented in the electronic map;
selecting, by the computer and based on the spatial displacement, between:
i) a first action of automatedly updating the electronic map by the computer using the environment data values; and
ii) a second action of providing, by the computer, a driving strategy for at least one mapping vehicle, the driving strategy including traveling the predefined region to acquire new data for updating the electronic map; and based on the selecting, executing, by the computer, whichever of the first and second actions that has been selected in the selecting step, wherein whenever the first action is selected, the electronic map is automatedly updated by the computer and the computer effects a modification of an automated drive by one or more of the plurality of vehicles by transmitting the automatedly updated electronic map over the wireless network to the one or more of the plurality of vehicles, which are configured to perform the automated drive based on the electronic map.

2. The method as recited in claim 1, wherein selection of the first action is performed in the selecting step when, and conditional upon that, the deviation does not exceed a predefined maximum deviation threshold.

3. The method as recited in claim 1, further comprising:
receiving driving-behavior data values that indicate at least one of lane usage and a speed of the plurality of vehicles at times when they acquired the environment data values; and
identifying an inaccuracy in the map that is indicated by the environment data values, wherein performance of the comparison is adapted based on the identified inaccuracy.

4. A device, comprising:
an interface to a wireless network; and
a computing unit configured to:
receive, from a plurality of vehicles driving through a predefined region and from the wireless network via the interface, environment data values that represent sensor signals generated by sensors of the plurality of vehicles sensing an environment in the predefined region
compare spatial data of features represented by the environment data values to spatial data of corresponding features represented in an electronic map, thereby determining a deviation representing a spatial displacement between the features represented by the environment data values and the corresponding features represented in the electronic map;
select, based on the spatial displacement, between:
i) a first action of automatedly updating the electronic map by the computer using the environment data values; and
ii) a second action of providing, by the computer, a driving strategy for at least one mapping vehicle, the driving strategy including traveling the predefined region to acquire new data for updating the electronic map; and
based on the selection, execute whichever of the first and second actions that has been selected in the selecting step, wherein whenever the first action is selected, the electronic map is automatedly updated by the computer and the computer effects a modification of an automated drive by one or more of the plurality of vehicles by transmitting the automatedly updated electronic map over the wireless network to the one or more of the plurality of vehicles, which are configured to perform the automated drive based on the electronic map.

5. A non-transitory machine-readable memory medium on which is stored a computer program for using an electronic map that is executable by a computer and that, when executed by the computer, causes the computer to perform the following steps:

receiving, from a plurality of vehicles driving through a predefined region, and via a wireless network, environment data values that represent sensor signals generated by sensors of the plurality of vehicles sensing an environment in the predefined region;

comparing spatial data of features represented by the environment data values to spatial data of corresponding features represented in the electronic map, thereby determining a deviation representing a spatial displacement between the features represented by the environment data values and the corresponding features represented in the electronic map;

selecting, based on the spatial displacement, between:

i) a first action of automatedly updating the electronic map by the computer using the environment data values; and ii) a second action of providing, by the computer, a driving strategy for at least one mapping vehicle, the driving strategy including traveling the predefined region to acquire new data for updating the electronic map; and based on the selecting, executing whichever of the first and second actions that has been selected in the selecting step, wherein whenever the first action is selected, the electronic map is automatedly updated by the computer and the computer effects a modification of an automated drive by one or more of the plurality of vehicles by transmitting the automatedly updated electronic map over the wireless network to the one or more of the plurality of vehicles, which are configured to perform the automated drive based on the electronic map.

* * * * *